S. A. SAMUELSON.
Car-Propellers.

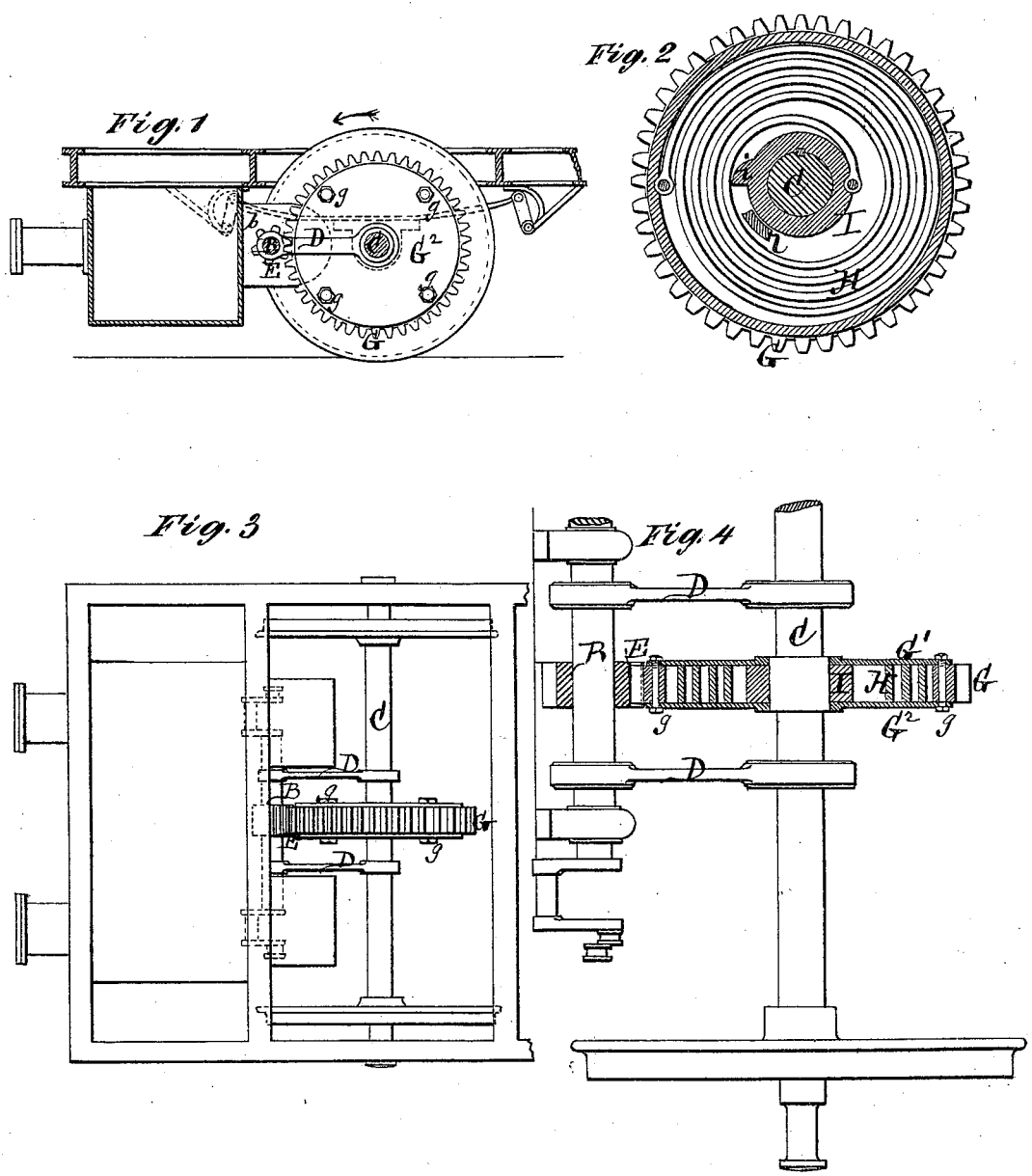

No. 151,626.

2 Sheets--Sheet 2.

Patented June 2, 1874.

Witnesses.
Michael Ryan
Fred. Haynes

S. A. Samuelson
by his Attorneys
Brown & Allen

UNITED STATES PATENT OFFICE.

SAMUEL A. SAMUELSON, OF HAMBURG, GERMANY.

IMPROVEMENT IN CAR-PROPELLERS.

Specification forming part of Letters Patent No. 151,626, dated June 2, 1874; application filed April 15, 1874.

*To all whom it may concern:*

Be it known that I, SAMUEL ARNOLD SAMUELSON, of the city of Hamburg, Germany, have invented an Improved Driving Apparatus for Steam-Carriages, of which the following is a specification:

My invention relates to certain improvements in machinery for driving steam-carriages on either railways or common roads. The invention consists in the connection of the crank-shaft and the axle or naves of the driving-wheels by means of gearing and a coiled spring, in the manner and for the purpose hereinafter particularly described and set forth.

Figure 5:
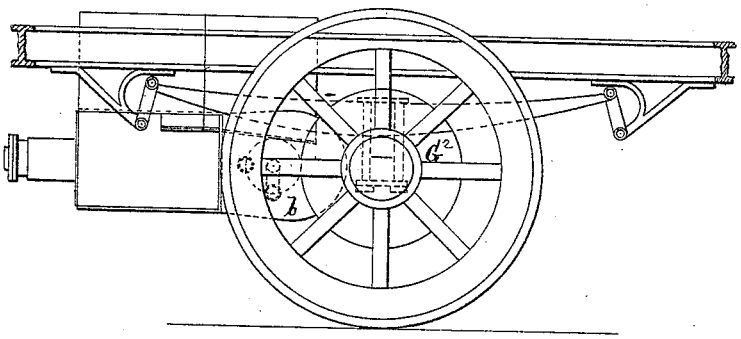
Figure 6:
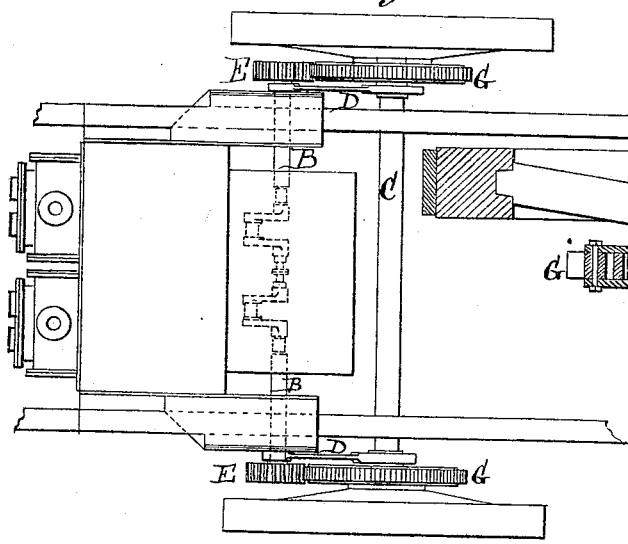
Figure 7:
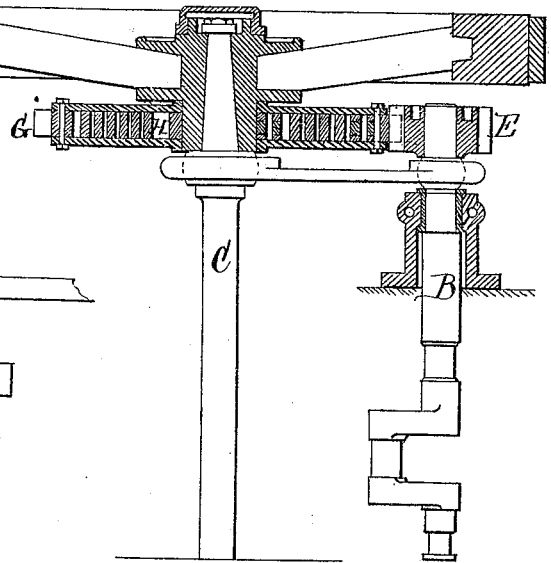

In the accompanying drawings, Figure 1 is a vertical section of my improved apparatus as applied to the driving-wheels of a locomotive. Fig. 2 is a sectional view of the larger gear-wheel and coiled spring carried thereby. Fig. 3 is a top view of the apparatus. Fig. 4 is a horizontal section on an enlarged scale. In Sheet 2, Fig. 5 is a side elevation of the apparatus as applied to a steam-carriage for common roads. Fig. 6 is a top view of the same. Fig. 7 is a horizontal section of the same on an enlarged scale.

The crank-shaft B is journaled in bearings in the sides of boxes $b$, which are sufficiently large to allow the cranks to completely revolve therein, said cranks being connected by pitmen with the piston-rod in any suitable manner, and the boxes serving to conceal and protect them. The axle C of the driving-wheels is journaled in boxes attached to semi-elliptical springs, the ends of which are secured to the frame of the carriage, so that the carriage is allowed to rise and fall without interfering with the transmission of motion from the crank-shaft to the axle. The crank-shaft B and axle C are connected by bars D, in the ends of which are eyes or rings through which said shaft and axle pass. On the crank-shaft B, about midway between its bearings, is a pinion, E, which meshes into a gear-wheel on the axle C. This gear-wheel consists of a ring, G, with teeth on its outer surface and placed between two plates, $G^1$ $G^2$, connected together and to the ring G by bolts $g$. The ring G is connected to the axle C by means of a coiled spring, H, one end of which is bolted to the inner surface of the ring and the other end is bolted to a collar, I, which is keyed to the axle C, so as to revolve therewith. On the collar I is a projection, $i$, which engages with a bar, $l$, running from the plate $G^1$ to the plate $G^2$.

When motion is transmitted from the pinion E to the gear-wheel G the engagement of the bar $l$ and projection $i$ causes the axle C and driving-wheels to revolve in the direction of the arrow, the strength of the spring being sufficient to give motion to the driving-wheels and axle without compressing the spring to any considerable extent.

When the brakes are applied to the driving-wheels the motion of the gear-wheel G continues until the spring H is completely wound up, and when the brakes are taken off the power accumulated by the compression of the spring assists in starting the carriage.

In Sheet 2 of the drawings, Figs. 5, 6, and 7 represent my improvements as applied to a steam-carriage for common roads. When so applied the gearing E G is duplicated, and is attached to the ends of the shaft and axle instead of the center.

What I claim as new, and desire to secure by Letters Patent, is—

The combination of the crank-shaft B, having the gear-wheel E, with the axle C, having the hollow gear-wheel G, containing the coiled spring H, fixed collar I, and bar $l$, all constructed to operate substantially as and for the purpose described.

S. A. SAMUELSON.

Witnesses:
   J. OHLSON,
   C. WITTE.